United States Patent
Black

[11] 3,811,579
[45] May 21, 1974

[54] MECHANIZED VAN LOADING AND UNLOADING APPARATUS AND SYSTEM

[76] Inventor: David F. Black, 3904 Hallmark Dr., Salt Lake City, Utah 84119

[22] Filed: Sept. 25, 1972

[21] Appl. No.: 291,663

[52] U.S. Cl. ........... 214/38 D, 214/75 G, 214/75 H, 214/517
[51] Int. Cl. ....... B65g 67/02, B60p 1/52, B60p 1/54
[58] Field of Search ........... 214/38 B, 38 BA, 38 C, 214/38 CC, 38 D, 515–517, 518, 75 R, 75 G, 75 H

[56] References Cited
UNITED STATES PATENTS

| | | | |
|---|---|---|---|
| 2,828,876 | 4/1958 | Parnie | 214/75 H |
| 2,514,752 | 7/1950 | Faulkner et al. | 214/38 D X |
| 3,397,802 | 8/1968 | Hinchee | 214/38 D |
| 3,040,914 | 6/1962 | Johnson et al. | 214/38 D |
| 3,186,566 | 6/1965 | Spinanger et al. | 214/38 D |
| 3,715,046 | 2/1973 | Marklund | 214/75 G |

Primary Examiner—Robert G. Sheridan

[57] ABSTRACT

Apparatus and a system for its use including mechanized means for moving a load of freight, as a unit, into or out of a van-type trailer, and a mechanized carrier for transporting portions of the load thereon which carrier is designed to take up a minimum cubic area within the trailer interior. The mechanized carrier is arranged to travel the length of the trailer and is capable of lateral and vertical movement therein to bring freight supporting means into contact with selected items of freight. The carrier is installed at the rear of the trailer behind or at the face of a load to off-load, at a delivery point, all or part of a load. The mechanized carrier is mounted to travel on rails arranged within the trailer, which railway can be extended out from the trailer and be supported on a dock area or by an appropriate stanchion to the ground below the trailer such that the carrier can exit the trailer thereover and deposit a portion of the load of freight onto the dock area or directly onto the ground below the trailer.

13 Claims, 11 Drawing Figures

PATENTED MAY 21 1974

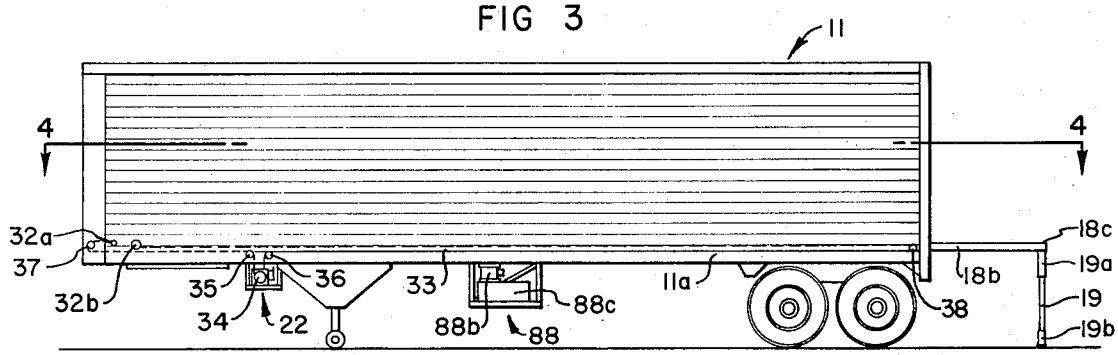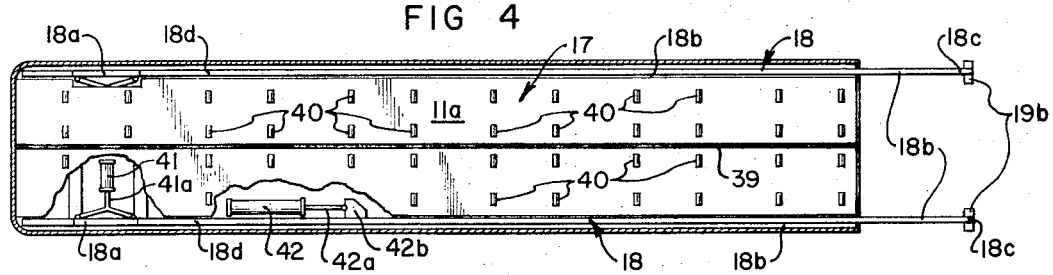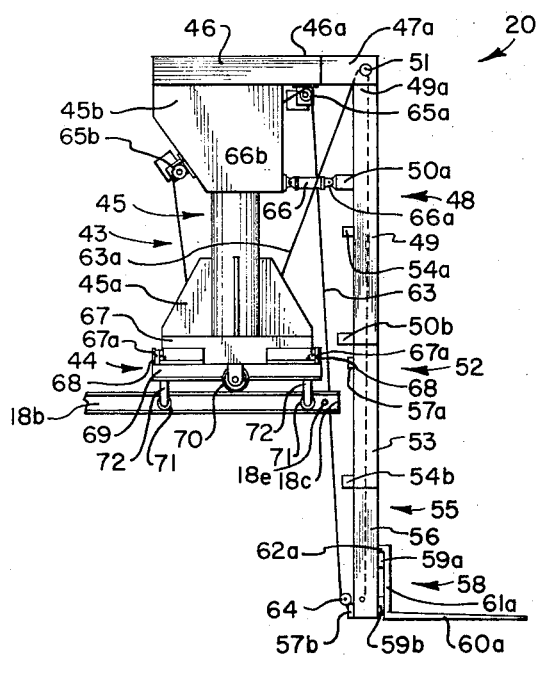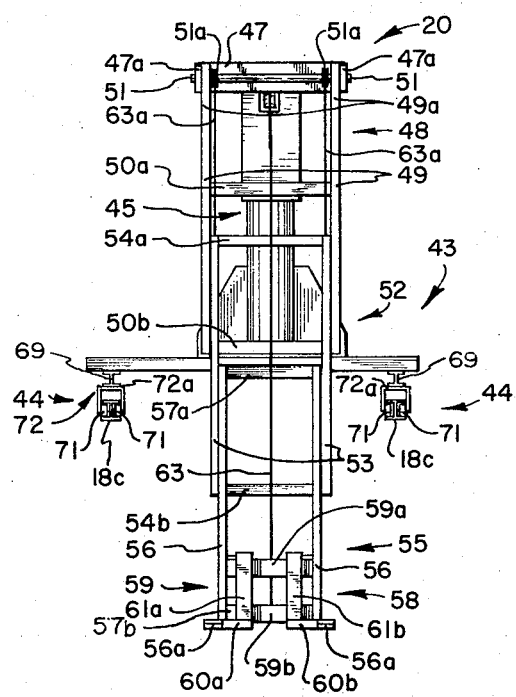

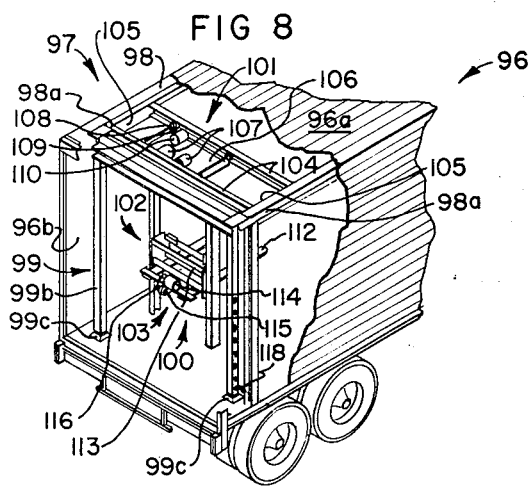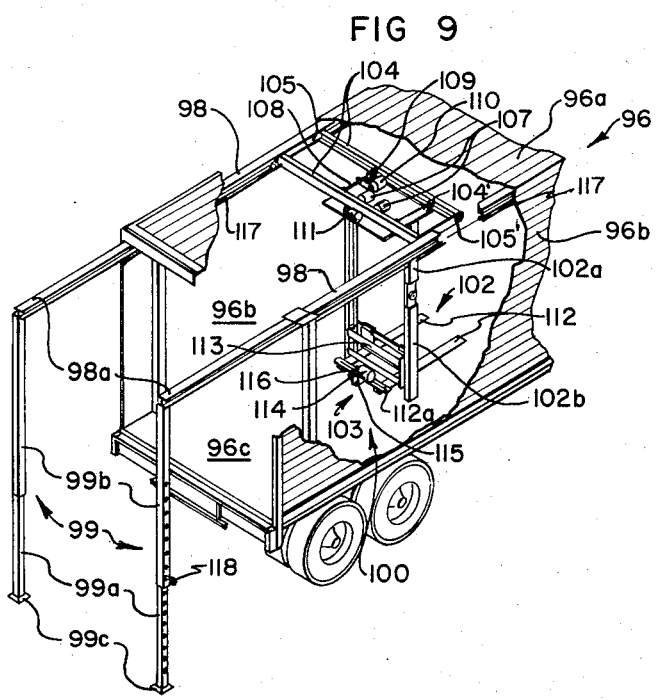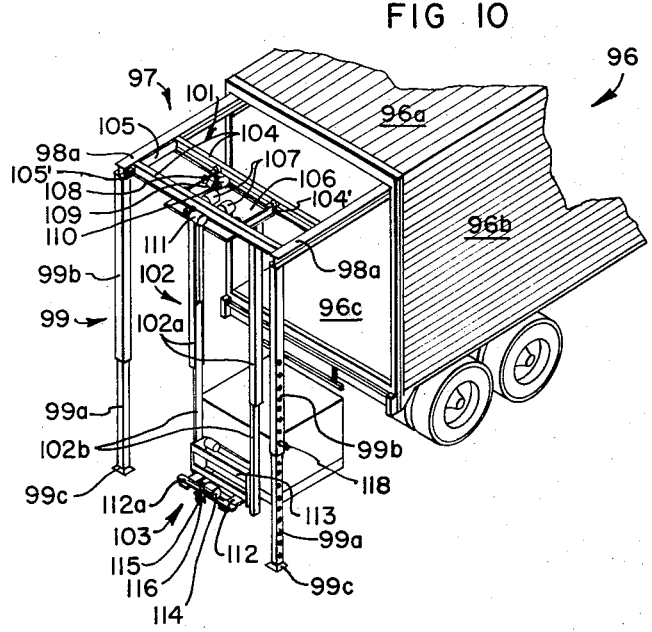

MECHANIZED VAN LOADING AND UNLOADING APPARATUS AND SYSTEM

The present invention also involves a system wherein a unit load of freight is formed on top of an appropriate skid that is arranged on a freight dock, the skid is moved with the load of freight positioned thereon as a unit into a van-type trailer such that the load can be removed from the trailer by merely reversing the direction of operation of the skid moving apparatus; or by utilizing a mechanized, remotely operated carrier within the loaded trailer to travel the length of the trailer, and to move laterally and vertically therein, so as to pick up individual items of freight on freight supporting portions thereof. The mechanized carrier can be moved out from the trailer, traveling over trailways extended therefrom, to deposit freight items onto a dock or onto the ground below the trailer.

BRIEF DESCRIPTION OF THE INVENTION

Field of the Invention

This invention relates to mechanized apparatus and a system for its use for moving a preformed or cubed load of freight into or out of a van-type trailer, and includes a mechanized carrier arranged for travel within the trailer that is capable of off-loading a part or all of the load onto a dock or to the ground immediately below or to either side of the trailer.

Prior Art

The handling of freight on a dock area has undergone numerous and marked changes in recent times leading towards mechanized and computerized systems wherein a single individual, positioned on a dock area operating a control panel or the like can move freight over the dock area. Once, however, the freight comes to rest in front of a dock door against which is aligned the rear of a freight carrying trailer, mechanized freight handling essentially stops. Unlike the mechanization that the dock areas have undergone, freight handling onto and off of a freight carrying trailer has changed little in the last forty years. With the exception of the use of fork lifts to move pallets of freight into a trailer and telescoping conveyors for accomplishing a like purpose, loading and unloading of freight is still a slow hand operation and therefore accounts for a large portion of the cost of transportation.

The need to provide for mechanized van loading has been recognized and patents such as U.S. Pat. Nos. 3,482,716 and 3,006,486 have been granted on overhead crane equipment for installation inside a trailer along the roof thereof. Such handling equipment, while it is capable of moving freight the length of a trailer, is not entirely satisfactory since it requires major structural modification to the trailer; takes up an unacceptable amount of the trailer interior volume; adds an unacceptable amount of weight to the trailer; and is useful only to move freight the length of the trailer. Consequently, the expense of such a system is generally not warranted by the time saved with its use.

Conveyors have of course, been known and in common use for many years and have been used extensively for loading a truck. Lift gates or lifting platforms have also been incorporated with trailers and vans to facilitate moving freight from or up to the level of the carrier floor.

U.S. Pat. Nos. 3,363,790, 2,422,549, 2,498,761 and 3,142,396, disclose variations of apparatus and systems involving lifting arrangements and, either permanently or temporarily installed conveyors, all arranged within a trailer for moving freight longitudinally therein. Such apparatus and systems, while eliminating manual lifting and carrying of freight from one end of the trailer to the other, still necessitates some manual handling of individual pieces of freight. These prior known apparatus and systems do not make provision for loading all or a significant portion of a load of freight into a trailer in a single operation and particularly in the case of permanently installed conveyors, require expensive and major modifications to the trailer frame to fit the components in place. While some time is saved using trailers fitted out with the apparatus of the disclosed patents, handling of the individual freight items is still required at the face of the load at least and therefore the time savings does not justify the capital expenditure involved.

Unlike the carriers of the aforesaid patents, the carrier of the present invention in addition to providing a means for moving freight the length of the trailer is capable of horizontal and vertical movement at the face of the load and has tines associated therewith capable of actually placing or picking up individual items of freight thereon. Further, the carrier of the present invention is arranged to travel on supporting rails within the trailer that are capable of being telescoped out from the trailer rear such that the carrier can be removed therefrom. The carrier of the present invention, unlike the carrier systems of the above cited patents can therefore be moved directly onto a dock area or can travel over the trailway to a point beyond the trailer rear such that freight transported thereby can be unloaded directly onto the ground below or at either side of the trailer rear.

The carrier of the present invention can, of course, also load or unload at dock height facilities.

While the mechanical carrier of the present invention provides a definite savings in labor in that a single operator can, as by pushing buttons on an appropriate portable console linked electrically to the carrier, effect freight handling in and out of the trailer, such freight must still move the length of the trailer. Therefore, to effect an appreciable time savings in freight handling, apparatus is required that is capable of loading and unloading, at one time, into or out of a freight carrying trailer, an entire or significant portion of a trailer load of freight. U.S. Pat. No. 3,368,704 discloses a vehicle loading and unloading apparatus including a loading platform that is capable of sliding longitudinally on a trackway within a trailer. Unlike the platform of the present invention, the platform of the aforesaid patent is intended to provide a step savings means with handling of the freight items required when the platform is loaded or unloaded at the face of the already formed load. As a fork lift traveling into a trailer and depositing pallets of freight at the face of the load performs the same operation as does the loading platform disclosed in the aforesaid patent, without necessitating trailer modification for its use, the expense involved in the incorporation of such a platform would therefore not seem warranted by the minimal advantages to be gained thereby.

While some of the aforementioned patents have recognized the need to handle freight by automated means onto and off of a trailer, no apparatus or system of apparatus has heretofore been capable, as is the present invention, of handling an entire load of freight, or a significant proportion thereof, at one time, onto or off of a trailer. Further, no apparatus, or system of apparatus has heretofore been capable of mechanically handling portions of a load of freight onto a dock area or onto the ground below the load carrying trailer, as required, as does the carrier of the present invention.

SUMMARY OF THE INVENTION

The inventor recognized that there was a need for freight handling equipment and a system for its use to mechanize totally the handling of freight into a van trailer and for off-loading that freight at its destination. Such a system, he concluded, should in part involve the formation of an entire or significant portion of a trailer load of freight on a dock area in preparation for its movement as a unit into a trailer, which trailer in the meantime could be occupied with other gainful employ while its next load is being formed on the dock. Forming the load on the dock it was recognized allows access to the sides and rear of the load such that a more dense load is obtained than is normally possible when a trailer is loaded from the front to back. The space savings using the loading system of the present invention, it has been determined, more than offsets the loss of available load area within a trailer that results from the inclusion within the trailer of a skid and even a freight handling carrier and railway therefore. Once formed, the freight load can be easily moved, in a matter of a few minutes and as a unit, into the trailer with the direction of freight load movement being easily reversed, as desired, to unload the entire freight load at another dock.

While point to point van load shipments do, of course, make up a significant percentage of freight movements, it was recognized that often a freight shipment is destined for a number of different locations, some of which may have dock facilities, with off loading at others requiring the shipment to be placed on the ground or off to the side behind the trailer. A system for handling by mechanical means a full truck load of freight loaded and unloaded as described and one wherein smaller freight shipments, going to a dock, or to be off loaded behind the van, was thereby determined to be desirable. These requirements, it was recognized, if met, would provide apparatus and a system for its use wherewith freight could be handled in a fraction of the time now required. Such time reductions in turn reduce equipment requirements, reducing man-hours per unit or weight of freight moved, thereby greatly reducing freight costs. Such a system, it is intended, would pay for itself in actual out of pocket savings.

While such a system as described above is obviously desirable, it must of necessity be practical. A system utilizing apparatus which would take up half the volume of a van would of course not be practical. Nor would a system involving apparatus that would be so heavy as to greatly reduce the carrying capacity of a van be practical. A system therefore wherein freight movement into and out of a trailer is accomplished by mechanized apparatus, which apparatus occupies a minimum of the trailer volume, was determined to be an ideal, and the goal to which the present invention is directed.

The apparatus of the present invention, it is believed, not only meets the above outlined criterion, but in fact, surpasses it. While it is admitted that installing the carrier and van loading apparatus of the present invention into a trailer will take up approximately 10 percent of the interior area of a van trailer, it is estimated that by efficiently forming a trailer load of freight on a dock area where access is provided around the sides of the load, that this loss in usable trailer area will be more than compensated for by the savings in cubic area within the trailer that is normally lost in rear end loading methods. It is estimated that using the aparatus and system outlined herein, it will be possible to load from 10 to 20 percent more freight than is now being loaded by conventional rear loading methods.

Further, as to weight, naturally mechanized equipment like the carrier and van loading apparatus of the present invention will have to weigh something, which weight should, of course, limit the hauling capacity of the trailer. While this contention seems apparent, in practice it is not the case. Rather, a 40-foot van, which has a legal carrying capacity of some forty-eight thousand pounds, is normally loaded at the rate of one thousand pounds per linear foot, or forty thousand pounds. Therefore, there is a differential of eight thousand pounds available that is not normally used. Even assuming a ten percent overload, there is still a four thousand pound differential available. The apparatus of the present invention, it is estimated, will weigh less than four thousand pounds, and therefore should not be a consideration in the trailers carrying capacity.

It is therefore the principal object of the present invention to provide apparatus and a system for its use which will meet the criterion and requirements outlined above.

Another object is to provide apparatus for moving a full or significant portion of a trailer load of freight at one time into a van-type trailer, which apparatus will take up only a comparatively small amount of the available area within the trailer, but will be capable of supporting a load of freight moved into or out of the trailer thereon.

Another object of the present invention is to provide a roller arrangement in the floor of the van trailer which is capable of supporting the load while it moves thereover during travel into or out of the trailer, which roller arrangement is so constructed to not detract from or limit the supporting strength of the trailer floor frame wherein it is preferrably mounted.

Still another object is to provide for moving a load of freight into a trailer by operation of a winch reeling in a cable strategically attached to a freight carrying skid.

Other objects are to provide a carrier for installation within a trailer and behind a load of freight positioned therein, such that the carrier is capable of longitudinal movement on rails arranged to extend the length of the trailer and beyond. The carrier is provided to be capable of lateral and vertical movements within the trailer so as to bring freight supporting means thereon into supporting alignment with selected items of freight arranged on the face of the load.

Still another object is to provide a carrier capable of movement on its railway, when the railway is appropriately extended and supported out from the rear of the trailer such that the carrier can transport selected items of freight onto a dock area behind the trailer or to lower freight to locations on the ground behind or to the sides of the trailer rear.

Still another object is to provide a carrier that is adaptable to travel either on tracks in the vehicle or on aligned tracks exteriorly thereof.

Still another object is to provide a carrier arranged to be controlled by an operator from a console installed along with an appropriate seat on the carrier or at another remote location, while being linked electrically to the carrier.

Still another object is to provide apparatus for moving a load of freight onto and off of a trailer, and a carrier for handling freight within and outside the trailer. The arrangement of apparatus within the trailer takes up a minimum cubic area therein and adds only a minimal amount of weight to the trailer. The value lost by the reduced volume and added weight will be more than compensated by the savings realized through more effective utilization of the trailer interior area.

Still another object is to provide mechanized apparatus to perform loading and unloading operations, with the cost of acquisition of the apparatus being offset by savings in equipment and labor directly resulting from incorporating the apparatus into a freight transporting system.

Principal features of the present invention include a skid arranged to receive a load of freight formed thereon. The skid is installed on a conveyor bed arranged on a dock area and a load of freight is formed thereon. The conveyor bed can be permanently installed in the dock floor or can itself be arranged to be movable thereon. The skid has short sections of cable connected to or has eyelets formed in a leading end thereof that is opposite to the dock door. The cables or eyelets provide attachment points for connection with a winch arrangement including a cable end having an end thereof adapted to move within an appropriate channel or trough, extending the length of a trailer. An attachment arrangement, such as safety hooks, is used to connect a winch cable end to the skid cables or eyelets. The winch is then operated, reeling in the cable end thereof and moving the cable end from the back to the front of the trailer, drawing the attached skid therebehind. To unload the skid from the trailer, a second winch is utilized. This winch is located at the end of the conveyor bed dock. The winch located on the trailer is placed in a free-wheeling state. The cable from the winch on the conveyor bed dock is attached to the skid as explained in loading. The conveyor bed winch is activated and pulls the load from the trailer onto the conveyor bed. At the same time, the cable from the trailer is being reeled in. The cable, unreeled from the trailer mount, is detached from the skid eyelet. Of course, the trailer winch cable could be wound appropriately over the trailer winch such that both cable ends, each threaded over an appropriate pulley arrangement in the front and rear ends respectively of the trailer with each end thereof attached to the end of the skid, as described. The winch, when turned in one direction, would thereby reel in one cable end and reel out the other, moving the skid either into or out of the trailer. When however, the direction of rotation of the winch drum is reversed, the direction of travel of the cable ends is reversed also, causing the skid to be moved in a direction opposite to its first direction of travel.

To accommodate the loaded skids movements over the trailer floor, a number of rollers are strategically arranged in the trailer floor to support the loaded skid as it travels thereover.

A supporting rail or beam structure, arranged within the trailer, serves as a track on which a freight carrying carrier travels. The rail or beam structure is arranged to be capable of being extended out from the trailer rear and to be supported to the ground therebelow. The carrier, supported by the extended rail or beam structure, can therefore be moved out from the end of the trailer such that it can deposit freight directly onto the ground to either side or behind the trailer. Where the freight unloading is to a dock, the carrier moves to the end of the trailer pivots and deposits the freight directly onto the dock. In the case of unloading at dock height, the extension beams are not necessarily required to be telescoped out from the aft end of the trailer.

The carrier, as has been stated, is capable of longitudinal movement within the trailer. Additionally, a lifting portion of the carrier, having freight supporting tines extending therefrom, is arranged to be capable of both lateral and vertical movement, enabling an operator remotely controlling the carrier with a console arrangement that is electrically connected thereto, to pick up individual freight items at the face of the load. In a preferred embodiment, the carrier is additionally arranged to be capable of rotating freight handled thereon, such that items picked up from the load face can be rotated to be off loaded ahead of the carrier, thereby simplifying the unloading of freight items off from the trailer.

The apparatus of the present invention, when used as described, provides mechanized means for greatly simplifying freight handling and reduces the time required for transferring a full load of freight onto and off of a van trailer from hours to minutes. The equipped trailer can therefore be used to perform work formerly requiring as many as three trailers, thereby greatly reducing equipment requirements. Since both the loading and unloading processes are mechanized, a single person controlling the apparatus through a control panel linked electrically to the apparatus of the invention, can alone move single or whole loads of freight in most handling situations. A single driver working alone with an equipped trailer can perform, in less time, the work functions that formerly required a driver and a helper. The apparatus of the present invention and the system for its use therefore provides a savings in equipment, man power, and time, which savings result in faster deliveries to customers and better service with resultant improved customer relations.

Additional objects and features of the present invention will become apparent from the following detailed description, taken together with the accompanying drawings.

THE DRAWINGS

FIG. 1 is a profile perspective view of a freight handling dock area showing van loads of freight being cubed thereon, with another van load of freight being moved into a van trailer having side and top areas partially broken away exposing the interior thereof;

FIG. 2 a profile perspective view of two van trailers, one of which is broken away exposing the interior thereof, in which trailers are arranged to operate an embodiment of a carrier of the present invention shown moving freight items;

FIG. 3 a side elevation view of a van-type trailer having a rail extension shown moved horizontally out from the trailer rear and supported to the ground at the ends thereof;

FIG. 4 a sectional view along the line 4—4 of FIG. 3, showing the trailer floor;

FIG. 5 a side elevation view of a first embodiment of a carrier of the present invention;

FIG. 6 a front elevation view of the carrier of FIG. 5;

FIG. 7a a hydraulic schematic for the carrier of FIGS. 5 and 6;

FIG. 7b a hydraulic schematic for the hydraulic power unit shown beneath the trailer in FIG. 3;

FIG. 8 a perspective view of the rear end of a van-type trailer shown partially broken away to expose a second embodiment of a carrier of the present invention arranged therein on an overhead rail support structure on which the carrier travels;

FIG. 9 a perspective view of the trailer of FIG. 8, showing the carrier support structure extended therefrom with the free ends supported to the ground; and FIG. 10, a perspective view of the trailer of FIGS. 8 and 9, showing the carrier moved out from the trailer rear traveling on its overhead rail support structure.

DETAILED DESCRIPTION

Figure 1:
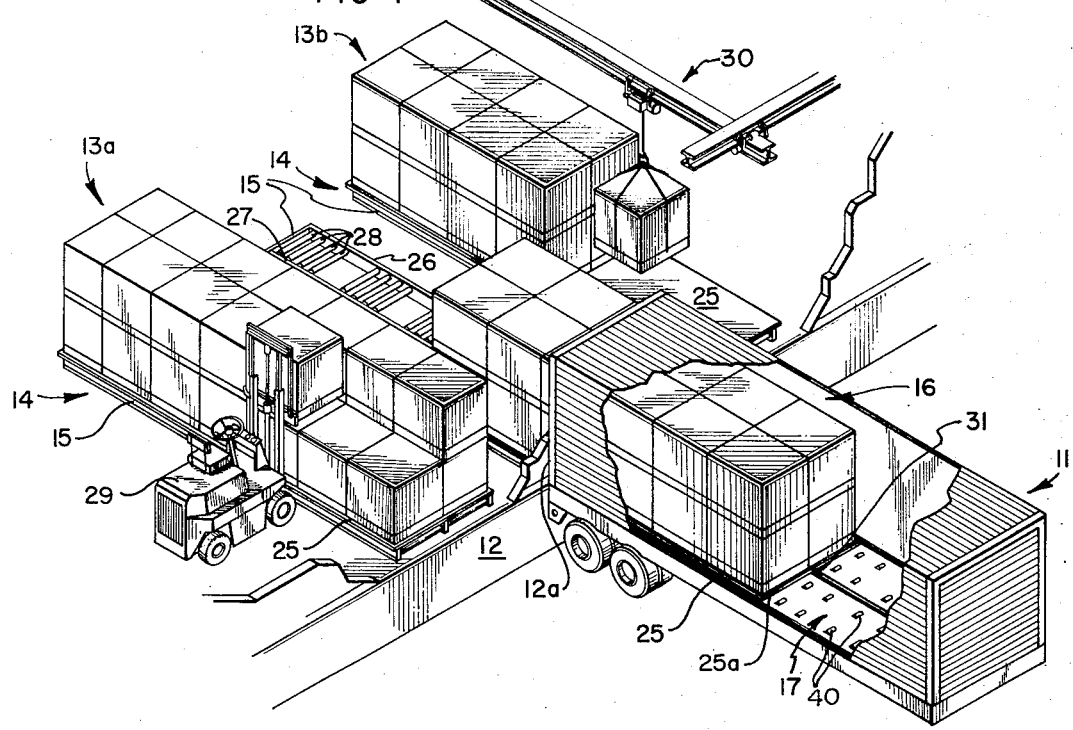
Figure 2:
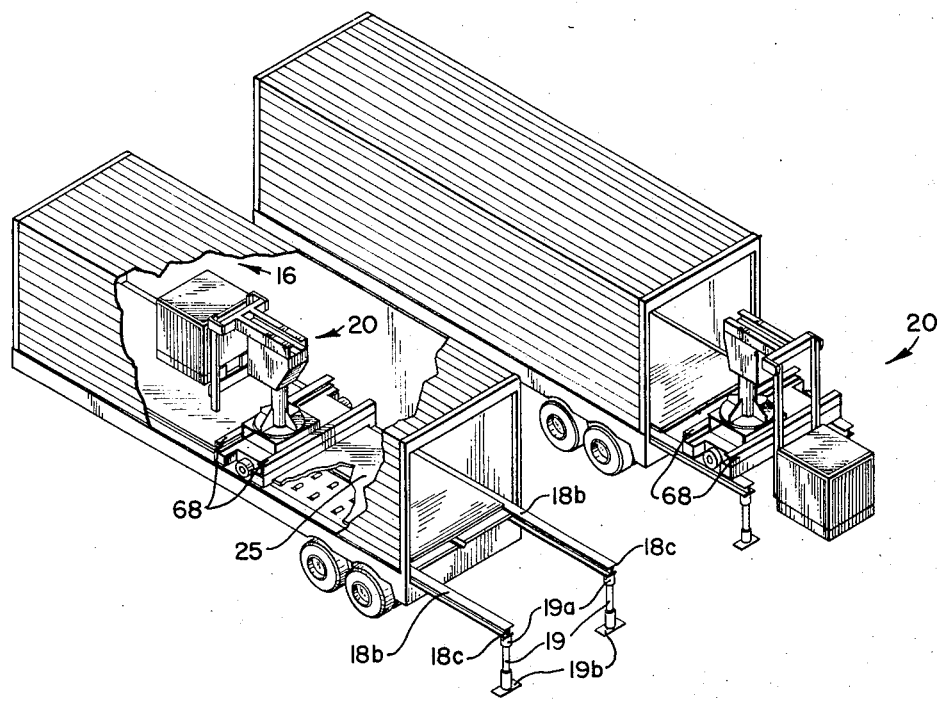
Figure 7A:
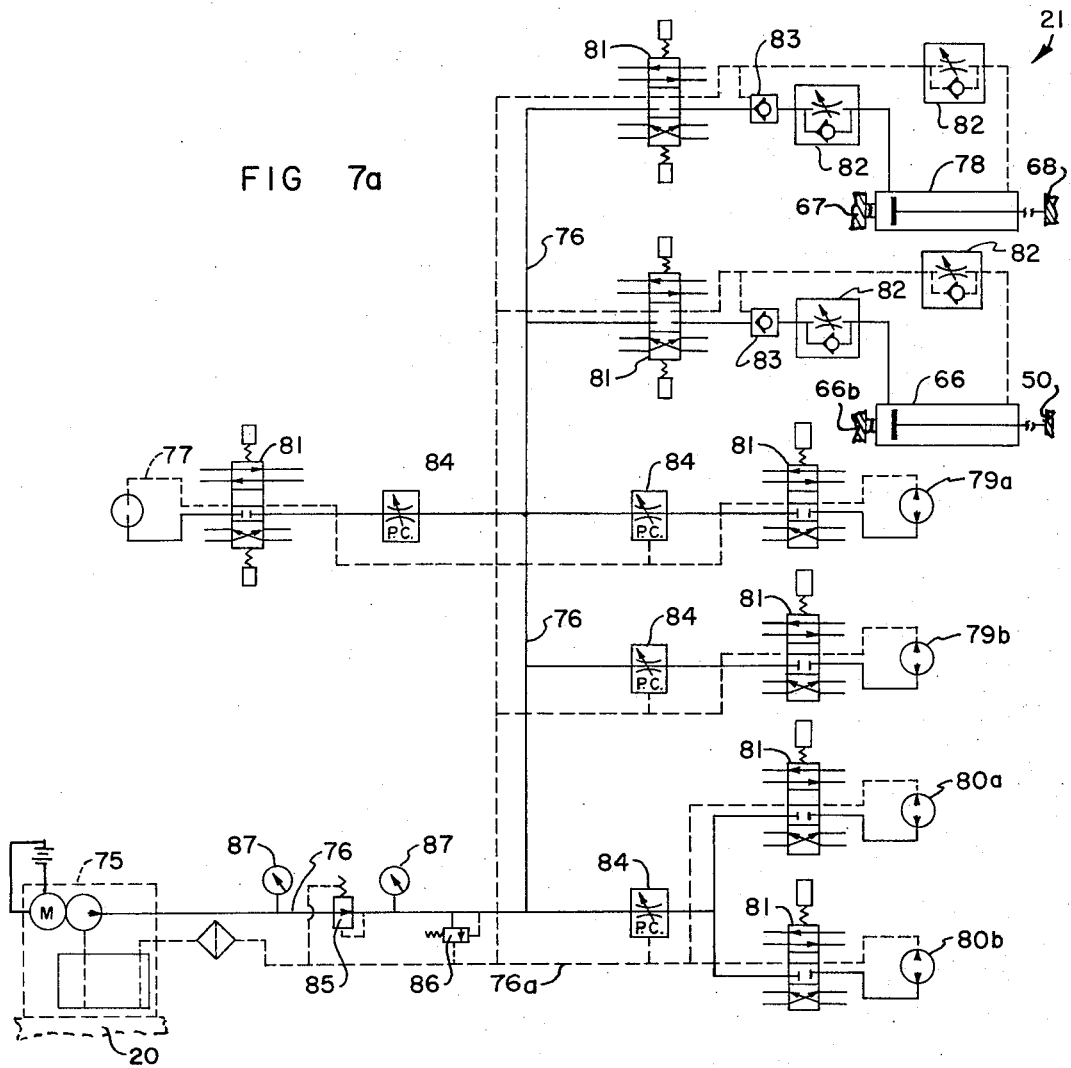
Figure 7B:
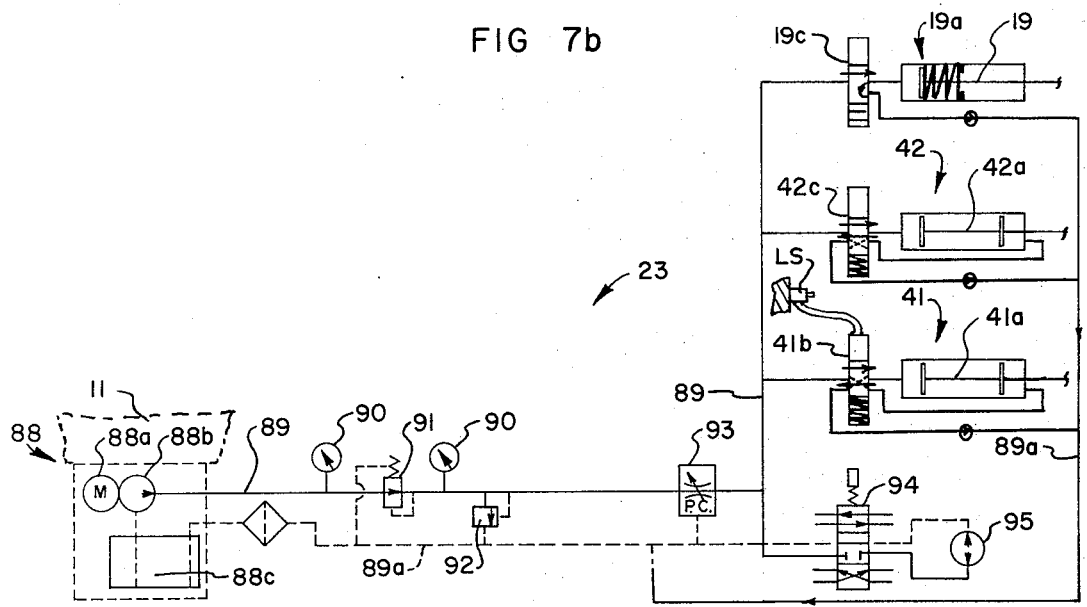

Referring now to the drawings:

Apparatus for performing mechanically freight handling functions involved in loading and unloading a van-type trailer are shown in FIGS. 1–7b, with FIGS. 8–10 showing a second embodiment of a carrier and rail structure therefore for handling freight within the van-type trailer. FIG. 1 shows a van-type trailer 11 backed against a freight handling dock 12 whereon loads of freight 13a and 13b are being formed within a freight loading system 14. A load of freight 16 is also shown as being moved from a conveyor bed 15 of the freight loading system 14 into trailer 11. FIG. 4 shows a sectional view of trailer 11 with a roller system 17 strategically arranged therein for supporting a skid 25, FIG. 1, of the freight loading system 14 as the skid moves therein in a manner to be hereinafter explained in detail. FIGS. 3 and 4 each show rail end sections 18a of a support rail system shown generally at 18. Rail system 18 is arranged to support a traveling carrier system 20 as the carrier system travels the length of the trailer 11. The rail end sections 18a are shown in FIG. 3 moved across the trailer floor 11a. It will be apparent that rather than telescoping outward from the trailer 11 rear as extensions of the rail system 18 the end 18c of rail sections 18b could be arranged to pivot from vertical stowed attitudes within the trailer downwardly, to the plane of the trailer floor 11a. Rail legs 19 are also shown as extending from the opposite ends of the rail sections 18b to the ground. FIG. 2 shows views of two trailers 11, each having the ends of rail sections 18b extending rearwardly therefrom and with first embodiments of a carrier system 20 shown within and without the trailers, and off-loading freight from the load of freight 16 placed therein. FIGS. 5 and 6 show side and front views of the carrier system 20 installed on trailer interior rails 18b of rail system 18, and FIG. 7a shows a hydraulic schematic 21 for the carrier system 20. A hydraulic schematic 23 is also shown in FIG. 7b of a system which supplies pressurized fluid to a winch system 22, used to move the skid 25 of the freight loading system 14 into the trailer 11.

The Freight Loading System

The freight loading system 14 shown in FIG. 1 consists of a skid transfer conveyor or ball transfer bed 15 arranged to support skid 25 thereon. The skid transfer conveyor or ball transfer bed 15 hereinafter referred to as the skid bed, is preferably formed as a rectangle having approximately the same side and end dimensions as does the floor 11a of the trailer 11, and consists of rigid side walls 26 with a center wall 27 positioned equidistantly therebetween and having rollers 28 or ball transfers, not shown, arranged to rotate between the side walls 26 and center walls 27, in a plane normal thereto. Side walls 26 and the center wall 27 therebetween are preferably formed from lengths of channel iron and are secured to or into the floor of the freight handling dock 12 so as to be opposite to trailer doors 12a thereof. It should be obvious that the skid bed 15 could be formed having end and stringer sections, not shown, therein to lend rigidity to the bed, and that wheel or caster means, not shown, could alternatively be installed thereon so as to provide the desired mobility to the conveyor bed. The skid bed 15, as shown and described above, extends somewhat above the floor of the dock. Thus the floor 11a of the trailer 11 must be arranged to be approximately level with or slightly below the level of the skid bed.

FIG. 1 also shows two methods of handling freight on the dock area 12 to rapidly and efficiently form a load of freight on top of the skid 25 as it rests on the skid bed 15. As shown, the freight load 13a is receiving freight from a fork lift 29. Fork lift 29 is shown installing a piece of freight on what will be considered the forward portion of the freight load 13a after the load has been moved into a trailer, not shown. With this arrangement a freight load formed on the dock area can be loaded into a trailer from the sides as well as from the rear end of the load. Such loading takes full advantage of the entire cubic area with a trailer and results in the formation of a more dense load than is normally possible when a trailer is conventionally loaded through its open rear in FIG. 1 and the load is built back from the front end of the trailer.

The freight load 13b is shown in FIG. 1 as it is alternatively formed by an overhead crane arrangement 30 lowering items of freight onto the skid 25 that rests on a skid bed 15. This method of freight loading also illustrates how a more dense load can be formed on the dock area 12 when access to the sides and top of the forming load is allowed, than can be obtained using conventional loading through the back of a trailer and working from the front end of the trailer to rear end.

FIG. 1 also shows a densely arranged completed load 16 being moved on skid 25 from the skid bed 15 into trailer 11. Skid 25 has an eyelet 31 or other like cable connection means arranged in the forward or nose end thereof 25a, through which by appropriate safety hooks, not shown, are secured the ends 32a and 32b of a winch cable 33 of the winch system 22, FIG. 3. An embodiment of winch system 22 is shown in FIG. 3 consisting of a rotating drum 34, around and over which is wound the winch cable 33, such that the cable ends 32a and 32b thereof are each available for connection to the skid 25. In this embodiment, rotation of drum 34, as by a hydraulic motor whose operation will be explained in more detail later herein, tends to reel in one end 32a of cable 33 and reel out the end 32b thereof. To draw the skid 25 into the trailer 11 the cable end 32a must be made to travel from the trailer rear end to the trailer front end at the same time as the cable end 32b is unreeled. To accomplish this winch cable movement, the cable end 32a is strung over idler wheels 35 and 37 extending to the forward or nose end of the trailer 11 from where it extends to the trailer rear whereat it is attached to the skid nose 25a. The cable end 32b is strung over idler wheels 36 and 38 emerging at the rear end of trailer 11, FIG. 3. Idler wheels 35 and 36, shown on line with one another and directly above the winch drum 34 in FIG. 3, and the idler wheels 37 and 38 are each arranged in the nose and rear ends respectively of the trailer 11.

The winch cable ends 32a and 32b are shown in FIG. 3 positioned in the forward or nose end of the trailer 11, in the position the cable ends occupy when they are attached to the forward end of the skid 25 when the skid is positioned within the trailer. To draw the skid 25 into the trailer 11, winch drum 34 is turned. The cable 33 is then drawn over idler wheels 35 and 37 and the cable end 32a which is attached through the skid eyelet 31 is reeled out over idler wheels 36 and 38. To offload the full trailer load, and to move the skid 25 out of the trailer 11, the direction of rotation of the winch drum 34 is reversed and the cable 33 traveling over idler wheels 36 and 38 is reeled in, drawing the cable end 32b attached to the skid 25 through eyelet 31 therewith. The cable 33 positioned over idler wheels 35 and 37 is then reeled out to travel freely with the skid 25 as it is pulled from the trailer 11. The cable ends 32a and 32b are arranged to travel within a groove track or V-shaped channel 39 formed in the center of the trailer floor 11a and extending the full length thereof.

Obviously, a winch system 22 could be arranged with two winches, one mounted to the trailer 11 as described, to move the skid 25 therein when operated, with the other winch mounted to the skid bed end opposite to the trailer 11. The skid bed mounted winch, not shown, would in turn have a cable, not shown, wound over a drum, not shown, which cable would in turn have a free end thereof available for attachment to a mounting point, not shown, on the rear end of the skid 25 opposite to the skid nose end 25a. Turning the winch drum described would in turn reel in the cable and cable end drawing the skid 25 therewith onto the skid bed 15. Operation of this second winch would of course require that the winch drum 34 be placed into a free wheeling condition such that the cable 32 would freely unreel therefrom as the skid 25 moves out of the trailer 11 onto the skid bed 15.

It should also be obvious that modifications of the winch system 22 could be incorporated to the system disclosed or different means could be used to move the skid 25 into the trailer 11.

When the skid 25 is moved by the action of a winch system 22, it preferably travels on the roller system 17 arranged in the floor 11a of the trailer 11. FIGS. 1 and 4 show such a roller system 17 as consisting of individual rollers 40 that are arranged strategically in the trailer floor 11a for supporting the skid 25 as it moves into the trailer 11. Each roller 40 is recessed into the floor with only the top most portions thereof exposed above the level of the trailer floor. By recessing the rollers 40, as shown in FIGS. 1 and 4, only a minimum cubic area of the trailer is lost to the freight moving system thus far described. Further, the skid, in order to present only a minimal loss of useful cubic area, is preferably formed of a fairly narrow gauge metal plate. A thickness of ⅛ of one inch of a sheet metal has been found to produce an adequate skid that takes up a minimum cubic area within the trailer, is capable of flexing freely when moved, but is sufficiently rigid to support a freight load of some 40,000 pounds thereon as the skid is moved into or out of the trailer. While such a section of metal plate is a preferred form of the skid of the invention, other skids having rollers or even an air supported skid, could be used without departing from the scope of the present invention.

The Carrier Rail System

The rail system 18 is located within the trailer 11, preferably on top of the trailer frame support structure, and extending the length of the trailer. The rail system is arranged in the trailer 11 to provide a track on which the carrier 20 travels.

The rail system 18, FIG. 4, consists of the two opposite and parallel rail sections 18b that extend along each side of the trailer 11. Rail sections 18b are telescoped in the trailer floor 11a and slide over a layer of low friction material, not shown, placed below the rail sections, to facilitate movement. Rail end sections 18a are displaceable with respect to rail sections 18b, to move into tandem alignment with the trailer interior ends 18d of the rail sections 18b when the rail sections are extended rearwardly of the trailer. The rail end sections are arranged in the trailer nose end area and are also recessed into the trailer floor 11a. So arranged, they slide into end to end alignment with the rail sections 18b when piston rods 41a, connected to the sides of the rail end sections, are expelled from hydraulic cylinders 41, recessed into the floor 11a. The rail sections 18b, like the rail end sections 18a, are moved hydraulically by the action of piston rods 42a that extend from hydraulic cylinders 42 that are also recessed into the trailer floor 11a. The pistons 42a, shown in FIG. 4, are arranged to act upon faces of brackets 42b, which brackets 42b are connected to and extend at normal angles from a side of each of the rail sections 18b.

The rail sections 18b are arranged in appropriate guides, not shown, within the trailer floor 11a and the guides insure that the rail sections, when extended, travel straight out from the trailer 11. At the end of the stroke of the pistons 42a, when the rail sections 18b are fully extended, an appropriate micro-switch or other such electrical means, not shown, is tripped, energizing the hydraulic cylinders 41. Operation of hydraulic cylinders 41, as has been explained, extends the piston rods 41a, thereby moving the rail end sections 18a into tandum alignment with the ends 18d of the rail sections 18b. Operations of the hydraulic cylinder 42 are of course initiated by a command signal, which command signal is preferably generated from a remote console.

Operation of hydraulic cylinders 42 as has been explained, ultimately initiates operation of the hydraulic cylinders 41, to extend outwardly the piston rods 41a and to move the rail end sections 18a. Full extension of the pistons 41a, in turn, operates an electrical switch, not shown, to initiate the extension of cylinder rods forming rail legs 19 outwardly and downwardly from cylinders 19a that are arranged on the outwardly extended ends 18c of the rail section 18b, FIG. 3. Feet 19b are secured to the ends of the rail legs 19 opposite to the cylinders 19a, and when a foot 19b contacts the ground a back pressure is created within the associated hydraulic cylinder 19a sufficient to stop the pressure application, causing the foot to be expelled. The back pressure required to be sensed is closely calibrated such that the height of the rail section ends 18c above the ground will be maintained at a constant level. As the trailer is loaded or unloaded the hydraulic cylinders 19a automatically adjust the length of the rail legs 19 to maintain this desired back pressure level, thereby maintaining the rail section end 18c at a constant height above the ground.

For safety purposes, conventional indicator lights on a console, not shown, from which the apparatus herein described is controlled, will light indicating that all mechanisms have been locked into position and are ready for use.

The sequential operations discussed above are of course reversed when it is desired to retrieve the rail legs 19 back into the hydraulic cylinders 19a and to pull the rail sections 18b back into the trailer 11. The hydraulic cylinders 41, 42, and 19a are double acting cylinders, capable of positively extending and pulling back their respective pistons 41a, 42a and rail legs 19. The ends of pistons 41a, 42a and rail leg 19, are in turn connected to the respective rail end sections 18a and the brackets 42b that are connected to the rail sections 18b.

It should be obvious from this description that the rail system 18 does not have to be extended when unloading or loading is onto or from a dock or at ground level. When so operating with the rail system 18 maintained within the trailer 11, a stop pin, not shown, is installed across the rail section end 18c to prevent an inadvertent passage of the carrier 20 thereof. When, however, it is desired to move the carrier 20 off from the rail system 18, the trailer 11 is moved to a point immediately adjacent and aligned with a rail system, not shown, arranged on or in the dock 12. The stop pin is removed from the rail section ends 18c and the carrier can then be moved under its own power out of the trailer 11 and onto the dock 12. Removal of the carrier from the trailer is necessary when a skid 25 loaded with freight is to be moved therein, as has heretofore been explained.

If recessing of the described rail system 18 into the trailer floor 11a will dangerously weaken the trailer understructure, it may be preferred to construct a false floor in the plane of the top of the rail system, above the trailer floor 11a. Such a false floor would of course decrease the available cubic area within the trailer 11, but would perhaps simplify the installation of the rail system 18 into an existing trailer while insuring that the trailer understructure would not be dangerously weakened by such an installation. Of course, if the rail system 18 is incorporated into the original construction of trailer 11, no such false floor would be required. Should a false floor be used, the rollers 40 would of course be installed in the top surface thereof rather than in the trailer floor 11a as has been described.

The Carrier System

A first embodiment of the carrier system 20 is shown in FIGS. 2, 5 and 6, wherein the carrier 20 is shown to consist of a freight handling portion 43 and a driving portion 44. The freight handling portion in turn consists of an upright mast 45 which is rotatably coupled at its base 45a to the carrier driving portion 44, by means not shown, and which has arms 46 connected across the mast top end 45b to project outwardly therefrom in a plane normal to the plane of the mast 45. In this embodiment, arms 46 are shown secured to the mast top 45b, but arms 46 also could be arranged as a track, having a second arm telescoped therein to travel back and forth while varying the length thereof and changing the distance between the mast 45 and the ends 46a thereof.

For the purposes of this description, arms 46 are shown as single sections of channel connected at a normal angle across the top of mast 45 and having a boom 47 connected to extend normally across the ends 46a thereof. The ends 47a of boom 47 are each bent outwardly therefrom, projecting at a normal angle to the plane of the boom 47, and extending in the same direction and in the plane of the arms 46. A first fork lifting frame 48 consisting of vertical parallel beams 49 and top and bottom cross or web members 50a and 50b, FIGS. 5 and 6, is pivotally connected at the top ends 49a of beams 49 by a rod 51 that extends between the boom ends 47a such that the first frame section 48 hangs therefrom.

A second fork lifting frame 52, FIGS. 5 and 6, consisting of vertical parallel beams 53, and top and bottom cross or web members 54a and 54b, is arranged such that the second frame 52 will slide within the first frame 48, with the outer surfaces of the parallel beams 53 thereof riding on and within the inner surfaces of the parallel beams 49 of the first frame 48. The second frame 52 is thereby capable of telescoping downwardly from and upwardly into the first frame 48.

A third lifting fork frame 55, like that of the first and second lifting frames 48 and 52, includes vertical parallel beams 56 and top and bottom cross or web members 57a and 57b, as shown in FIGS. 5 and 6. The parallel beams 56 are telescoped inside the vertical parallel beams 53 of the second frame 52, and extend downwardly from and upwardly into the second frame 52.

The first frame 48 is pivotally connected by pins 51 to the boom 47. The second frame 52 is arranged to slide vertically within the first frame 48, along the outside surfaces of the vertical parallel beams 53 thereof. The third frame 55 is arranged to slide vertically within the second frame 52, along the outside surfaces of the vertical parallel beams 56 thereof. As shown best in FIG. 6, vertical movements of the frames 48, 52, and 55, one within the other, is ultimately limited by stops 56 that are secured to the bottom ends of parallel beams 56 of the third frame 55. The stops are arranged to contact, in turn, the bottom ends of both the parallel beams 53 and 49 of the first and second frame sections 52 and 48, thereby limiting vertical travel of the frame sections within one another.

The freight handling portion 43 of carrier 20 further includes a freight supporting fork lift platform 58, hereinafter referred to as the fork platform. The fork platform 58 consists of a carriage composed of top and bottom cross pieces 59a and 59b whose ends are arranged to slide along the inside edges of the parallel beams 56 of the third frame section 55. Upstanding body portions 61a and 61b of fork tines 60a and 60b are shown in FIGS. 5 and 6, vertically linking the top and bottom cross pieces 59a and 59b. Tine body portions 61a and 61b each have lips 62a formed on their ends opposite the fork tines 60a and 60b, which lips 62a project inwardly opposite to tines 60a and 60b at a normal angle with the body portions 61a and 61b, to overlap the top edge of the top cross piece 59a. The tine body portions 61a and 61b extending from the fork tines 60a and 60b are shown connected to the top and bottom cross pieces 59a and 59b, but of course, could be made adjustable thereon such that the distance between the tines 60a and 60b could be made to vary to accommodate different widths of freight.

As has been explained, the frames 48, 52 and 55 are arranged to telescope within one another so that the fork platform 58, which is arranged to travel vertically within the third frame section 55, can travel from a point that is approximately two feet from the top of the trailer 11 to a ground contact point that is well below the trailer floor 11a. To effect this vertical displacement of the fork platform 58, a cable 63, FIG. 5, that is attached to a connection ring 64 secured to the midpoint of the fork platform bottom cross piece 59b, is reeled in or out to raise or lower the fork platform 58. Cable 63, as shown in FIG. 5, is strung over a pulley 65a, that is arranged below and connected to the arm 46, passes over a pulley 65b, that is arranged on the back of the mast 45, opposite to the telescoped frames and fork platform 58, and is connected to a hydraulic winch means, shown as 79a in the hydraulic schematic of FIG. 7a, located within the freight handling portion 43.

Movement of the cable 63, as described, controls vertical movement of the fork platform 58, such that an operator, energizing appropriate electrical circuits that control a hydraulic motor arrangement, can control vertical displacement on the fork platform fork tines 60a and 60b. Freight can therefore be handled from the top areas of a trailer as it is moved out from the trailer onto the ground below. Additional vertical movement is provided for by moving cable 63 to raise or lower the fork platform 58 as has been already described herein. In addition to cable 63, two cables 63a, shown in FIGS. 5 and 6, each extend between the mast 45 over pulleys 51a that are rotatably mounted to pin 51 to extend alongside the vertical parallel beams 49 and to connect, as shown in dotted lines in FIG. 5, to the vertical parallel beams 56 of the third frame section 55. By reeling in cables 63a, as with a winch shown schematically at 79b (FIG. 7a), the third frame section 56 is moved upwardly within and between the parallel beams 53 of the second frame section 52.

Continued upward movement of the thrd frame section 55 brings the stops 65a, arranged on the bottom ends of parallel beams 56, thereof, into contact with the bottom ends of the vertical parallel beams 53 of the second frame section 52, thereafter simultaneously elevating the second and third frame sections 52 and 55. The second frame section, in turn, slides within and between the vertical parallel beams 49 of the first frame section 48 until the telescoped together second and third frame sections are fully telescoped within the first frame section, whereat the stops 56a rest against the bottom ends of the vertical parallel beams 49 of the first frame section 48.

The telescoping frames are arranged to be capable of being tilted from a vertical attitude around the pivotal connection of the first frame 48 to the boom 47. Pivotal motion of the first frame 48 and the second and third frames 52 and 55 arranged therewith, is controlled by a double acting hydraulic cylinder 66 connected at its cylinder end 66a to the mast 45 and at its piston rod end 66b to approximately the mid-point of the top web or cross member 50a of the first frame 48, FIG. 5. Outward or inward movement of the piston end 66b of the cylinder 66 tends therefore to pivot the first frame 48 and the second and third frames 52 and 55 arranged therewith, allowing ends of the fork tines 60a and 60b of the fork platform 58 to be positioned to slide under a piece of freight as required, and to allow the horizontal attitude of the fork tines to be adjusted to maintain an item of freight carried thereof in an upright attitude.

Capability of movement of the freight handling portions of the carrier 20 is, however, not limited to the vertical. The mast base 45a, which as has been noted is capable of rotation, is supported on a carriage platform 67 that has carriage wheels 67a axially connected and projecting outwardly from the sides thereof, FIG. 5. The wheels 67a are positioned to roll freely in channel sections 68, FIG. 2, that are arranged across the top of the carrier driving portion 44. The carriage wheels 67a control lateral movement of the mast base 45a in channel sections 68 with a double acting hydraulic cylinder shown as a hydraulic cylinder 78 in FIG. 7a, providing the moving force. The hydraulic cylinder 78 is connected to the bottom of the carriage platform 67 with the piston rod thereof connected to one of the channel sections 68. Movement of its piston rod with respect to cylinder 78 thus causes the mast 45 to move laterally. As will be further explained, operation of the hydraulic cylinder is also remotely controlled by an operator at a remote console.

Mast 45 is rotated on the carrier drive portion 44 by a hydraulic motor 77 (FIG. 7a) operated in response to an electrical signal from an operator controlled remote panel. The mast is mounted for full circle rotation so that it can swing freight items picked up from the face of the load around for deposit onto a dock or to the ground behind or to either side of the trailer.

The carrier driving portion 44, shown best in FIGS. 5 and 6, includes the platform 67 to which mast 45 is coupled, and a carriage frame 69 on which are mounted the various hydraulic motors and pumps for supplying pressurized fluid to: rotate the mast 45; to operate the hydraulic winch for moving the cables 63 and 63a; and to turn wheels 67a, thereby moving the mast 45 laterally.

The carriage frame 69 also carries hydraulic motors, the operation of which will be fully explained with respect to the hydraulic schematic shown in FIG. 7a. The hydraulic motors are coupled to drive wheels 70 that are arranged on the sides of the carriage frame 69, for supporting and moving the carrier 20 on rails 18b, FIG. 5. Wheels 70 are turned by the aforesaid hydraulic motors to move the carrier 20 on rails 18b longitudinally within and without the trailer 11, as has already been heretofore described.

Pairs of support rollers 71, FIG. 6, are axially journalled to the respective opposite sides of sections of U- shaped channels 72 having webs 72a connected to the undersides of the carrier frame 69. Rollers 71 are thus arranged to travel between the upper and lower opposing flanges of rails 18b. Rails 18b, as shown in FIG. 6, are typically formed from sections of I beams with the flanges extending outwardly from the web to support and contain the pairs of support rollers 71. The opposed rollers 71 limit tipping or unwanted vertical movement of the carrier, while allowing the carrier to smoothly traverse the length of the trailer 11. As has been explained, drive wheels 70 are turned in response to operation of appropriate switch means on a remote console controlled by an operator, to move the carrier 20 longitudinally within and without the trailer 11 on the rails 18b. The longitudinal movement of the carrier 20 is limited only by contact with a limit switch LS, FIG. 7b, at the nose of the trailer 11, and by contact of the carrier support rollers 71 with stop pins, not shown, inserted into holes 18e, FIG. 5, in the ends 18c of rail sections 18b. Should the stop pins be removed therefrom, as when the rail section ends 18c are aligned with a similar rail system arranged on or in the dock 12, then the carrier 20 can be moved from the rail system 18 onto the dock 12. Such movement of the carrier 20 would be undertaken when the carrier is moved from the trailer 11 to perform maintenance thereon, or when a full load of freight is to be loaded onto or off from the trailer 11.

As has been previously explained in connection with the description of the carrier 20, while other mechanical and electrical systems could be used, it is presently preferred that the various lifting and displacement systems associated with the carrier be hydraulically operated. The presently preferred system is shown schematically in FIG. 7a. As shown therein, pressurized fluid is generated by a hydraulic power unit 75, which consists of a pump driven by an electric motor and a fluid reservoir. The hydraulic power unit 75, along with the various hydraulic motors, is preferably mounted within the carrier 20 so that it is not necessary to connect the carrier to the pressure source by flexible lines or the like. The carrier mounted arrangement simplifies construction and saves cubic area within the trailer which would otherwise be taken up with fluid transfer lines. However, if desired, the hydraulic power unit 75, could be positioned in the trailer or under the trailer, along with a power unit 88 for supplying pressurized hydraulic fluid to the winch system operating the winch drum 34 in the freight loading system. The operation of the power unit 88 will be hereinafter explained in detail.

Referring now to FIG. 7a, it can be seen that pressurized hydraulic fluid moves from the hydraulic power unit 75, through a line 76 which branches off into various legs supplying a mast rotator motor 77; a mast transverse double acting cylinder 78, whose operation moves the carrier mast transversely; a fork lifting, frame tilt, double action cylinder 66; fork lift and frame lift cable motors 79a and 79b respectively, the operation of which move cable 63 to raise or lower the fork platform and the fork lifting frames 48, 52 and 55, respectively; and two carrier drive wheel motors 80a and 80b, connected to turn the individual carrier drive wheels 70. Fluid under pressure flows to each of the motion producing apparatus described above, through the various feed legs of line 76, and back to the hydraulic power unit 75 through return lines, shown as broken lines 76a. The flow to the various apparatus described is controlled by a solenoid valve 81, which is energized through an electrical switch means at a remote console arrangement. An operator operating the console can be remote from the carrier 20 or sit on an appropriate seat on the carrier if the console is so arranged, moving the carrier within the trailer 11 and by operating the appropriate switches thereon to load and unload freight onto the fork tines 60a and 60b; move the carrier 20 along rails 18b within and without the trailer 11; rotate mast 45; and lower the fork lifting frames 48, 52 and 55 to deposit or pick up pieces of freight onto or from the ground below or to the side of the trailer, or place items of freight directly onto a dock. The schematic view shown in FIG. 7a, also shows various flow controls 82; check valves 83; pressure controls 84; a pressure reducing valve 85; a pressure relief valve 86; a filter strainer 86a; and gauges 87, which all perform functions in monitoring and controlling pressure within required limits flowing to the carrier hydraulic system.

Another power source or a combination of electric and hydraulic motor means could be substituted for the hydraulic system described, should this be desired. As noted pressure fluid for the hydraulic system is generated by a pump turned by an electric motor, which pump and electric motor are arranged within the hydraulic power unit 75. The electric motor can be powered by a separate rechargeable battery, as shown in FIG. 7a, or it could be powered from the electrical system of the trailer or a towing tractor, through a sliding wiper arrangement (not shown) on the carrier 20. In such an arrangement the wipers would be in continuous contact with a conductive metal strip, not shown, arranged along the interior of the trailer 11.

FIG. 7b shows schematically, a preferred arrangement for supplying hydraulic fluid under pressure to winch system 22 and to the hydraulic cylinders 41, 42 and 19a associated with the rail system 18. As shown, the arrangement includes a hydraulic power unit 88 including an electric motor 88a, a fluid pump 88b, and a reservoir 88c. Fluid is supplied through the pump 88b and a lne 89 and is returned through a line 89a (shown broken). Gauges 90, a pressure reducing valve 91, a pressure relief valve 92, and a flow control regulator 93 are all provided in line 89. Electrically operated solenoid valves 94, 41b, 42c, and 19c are also arranged in branches to line 89 to regulate flow through the branch lines to the double acting hydraulic cylinder 41 and 42 which move rail sections 18b and rail end sections 18a, respectively, and the hydraulic cylinder 19a whose operation displaces the rail leg 19 vertically. Pressure fluid to drive the reversible hydraulic motor 95 that operates winch drum 34 is supplied to and exhausted from the motor through lines 89 and 89a, respectively, and through solenoid valve 94. If for some reason the hydraulic power unit 75 cannot be conveniently carried on the carrier 20, a single hydraulic power unit, located on or under the trailer 11, could be used in place of both hydraulic power units 75 and 88.

In FIGS. 8–10, there is shown another embodiment of carrier for performing the same freight handling functions as the carrier 20 heretofore described. The carrier shown generally at 100 is suspended from a support rail system 97 arranged in the rear end of a van-type trailer 96. The support rail system 97, shown in FIGS. 8 and 9, consists of parallel rail sections 98 that are arranged opposite to one another along the junctions of the trailer top 96a and sides 96b. As shown in FIGS. 8 and 9, the rail sections 98 are preferably formed from I beams having upper and lower parallel flanges between which are arranged carrier drive wheels, 105, FIG. 9, which support and move the carrier 100 longitudinally within the trailer 96. The rail sections 98 are arranged to be capable of sliding on fixed rails 117, longitudinally from the trailer, such that ends 98a thereof project as extensions from the rear of the trailer. The projected portions of the rails thus provide an overhead rail system that projects beyond the rear end of trailer 96 and on which the supporting carrier 100 can travel. Obviously, sliding end portions 98a of the rail sections 98 out from the trailer rear shortens the relative length of the portions of rail sections 98 remaining in the trailer, thereby limiting the travel of the carrier 100 inside the trailer.

As shown in FIGS. 8 through 10, rail legs 99 are connected to the ends of the rail section ends 98a to extend perpendicularly downward therefrom to contact the ground below the trailer 96. Rail legs 99 thereby act as columns for supporting the ends of rail section end 98a as the carrier 100 travels outward from the trailer rear thereon. As shown in FIG. 8, the lower ends 99a of each of the rail legs, can be telescoped upwardly into the rail leg body 99b, to bring the tops of feet 99c, secured to the rail leg lower ends 99a, into contact with the lower end of the rail leg body 99b. By telescoping the rail leg lower end 99a into the rail leg body 99b the overall length of the rail legs 99 are reduced such that the bottoms of the rail leg feet 99c will just clear the floor 96c of the trailer 96 when the rail section ends 98a are moved into the trailer. Pins 118 (FIGS. 9 and 10) or other such connection means are inserted through appropriate aligned holes, not shown, in each of the rail leg lower ends 99a and rail leg bodies 99b to lock these components together in an extended condition with the feet 99c resting on the ground. The same pin 118 is used to lock the rail leg end 99a into a telescoped position in the rail leg body 99b as shown in FIG. 8.

With the rails extended beyond the end of the trailer, as disclosed, the carrier 100, to be hereinafter explained in detail, can pick up freight at the face of a load within the trailer and deposit the freight onto the ground below and behind the trailer.

The carrier 100, FIGS. 8-10, includes a rack shown generally at 101, a telescoping fork lifting frame 102, supported so as to be capable of traveling longitudinally on the rack 101 between the ends 105 thereof, and a fork platform 103 arranged to travel vertically along the lifting frame 102. Rack 101 is generally rectangular, with the legs 104 thereof, preferably formed of I beams and extending between rail sections 98 and with drive wheels 105' on opposite ends of an axle extending through the ends 105 alongside the legs 104. The drive wheels 105' are turned with the axles to move the rack 101 longitudinally on rail sections 98. A reversible electric motor 111, FIGS. 9 and 10, is fixed to one leg 104, intermediate the length of the leg and operates the drive wheels through a conventional sprocket and chain arrangement.

The fork lifting frame 102 is connected to the opposite ends of the platform 106 to hang vertically downwardly therefrom. The platform 106 and the connected lifting frame 102 are in turn moved longitudinally on the rack 101 between the rail sections 98, on wheels 104' that travel on inturned flanges of legs 104. Wheels 104' are turned through an axle 108, FIGS. 8-10, that are rotated by a chain 109 which is driven by an electric motor 110 that is mounted, along with motors 107, on top of platform 106.

The lifting frame 102 consists of parallel top and bottom vertical members 102a and 102b, FIG. 10, which in addition to being moved laterally, are arranged to telescope together with the lower frame member 102b telescoping into the upper frame member 102a to shorten the overall frame length. This respective overall lifting, frame lengthening, and shortening is controlled by the electric motors 107, that are mounted on the platform 106. Motors 107, through a conventional mechanical linkage, not shown, moves the bottom frame member 102b vertically within the top frame member 102a and when the bottom frame member is fully telescoped within the top frame member, moves the fork platform with respect to both frame members. The fork platform 103 is therefore movable vertically from a point just below the trailer roof 96a, to engagement with the ground or a loading dock below the trailer 96.

The fork platform 103, as has been described, is movable vertically, laterally, and longitudinally within the trailer 96. Thus, the fork tines 112 can be moved into contact with the bottoms of selected face items of freight making up a load hauled in the trailer 96 regardless of the position of the selected items within the trailer. The tines 112 like the tines 60a and 60b of the carrier 20, previously described, can be fixed to extend outwardly from the fork platform 103, or can be arranged to be movable thereon such that the relative distance between the tine ends can be adjusted to accommodate various dimensions of freight handled thereon. As illustrated, the tines 112 are shown to be linked by a web member 112a and extended perpendicularly outward from the lower end of a fork tine frame 113, that is positioned between the inside surfaces of the opposing vertical sides of the bottom frame member 102b. The tines 112 and tine web 112a are arranged to be displaceable a distance back from under the fork tine frame 113. It should be obvious that, like the fork lifting frames 48, 52 and 55, of carrier 20, the lifting frame 102 could also be made to tilt from a vertical plane to facilitate angular placement of the fork tines 112 being positioned beneath a piece of freight should this be desired. Also, as shown in FIG. 10, it is sometimes necessary, when handling a wide item of freight thereon, to displace the fork tines 112 and fork tine web 112a out from under the item of freight. Such a fork tine and tine web member moving means is shown best in FIG. 10. As shown, a motor 114 fixed to the web member 112 drives a wheel 116 journaled on an axle suspended beneath the web member. A chain interconnects sprockets on the output shaft of the motor and on wheel 116 so that when the wheel is in engagement with a ground or dock surface the wheel will move the tines into or out of the position beneath the load.

It should of course be obvious that though electric motors have been shown as the preferred form of driver means for moving the carrier 100 and the apparatus associated therewith, and hydraulic motor means have been shown as the preferred form of driver means for moving the carrier 20, and the apparatus associated therewith, the driver means for either carrier could be made to consist of either or both hydraulic and electric motors or any other power source. It should additionally be obvious that, though a wiper and bus bar arrangement has been described with respect to carrier 20 as the preferred form of transferring electrical energy to the carrier 20, and that such arrangement is also preferred to transfer electrical energy to the carrier 100, other energy transfer arrangements could be used. Further, though the carrier 20 and freight loading system 14 described herein have been preferably controlled from remotely positioned switches connected electrically to the carrier and freight loading system, it should be obvious that other control arrangements could be used. Also, it should be ovbious that the remote switches could be an integral part of a console that may conveniently be arranged, along with an appropriate seat, on either carrier 20 or 100 such that an operator could travel therewith to control the operation of the carrier.

The invention described herein involves apparatus for mechanically performing many heretofore manually performed operations in the handling of freight as it is moved onto and off of a van trailer. The invention involves both the apparatus and a preferred system for its use, whereby freight items can be loaded and unloaded, either in full or partial truck load lots, by a driver sequentially controlling the various apparatus described through remote switch means. The preferred system of the present invention therefore involves loading a full van load of freight onto a skid 25, which skid is positioned on a skid bed 15 arranged on or in a freight handling dock 12. The load of freight could be formed, as is the load 13a of FIG. 1, by a fork lift 29 stacking together the pieces of freight making up the load, or could be formed as is the load 13b by an overhead crane 30 installing freight at various locations in the load. It can be seen that both loads 13a or 13b are very dense, and that they utilize the maximum volumetric area available within a trailer. By providing access to the forming load from the sides, top and the rear end thereof as does utilization of the loading apparatus of the present invention, rather than just from the rear end only as is the case if a trailer is loaded by conventional means from front to back, a more densely packed trailer load of freight is achieved.

The formed load is then moved, as shown by moving load 16 in FIG. 1, into a trailer 11. The movement of load 16, is cccomplished by pulling the loaded skid 25 off from the conveyor bed 15 and into the trailer, with the skid 25 riding on and being supported by rollers 40 spaced within the trailer floor 11a. The skid 25 is moved into and out of trailer 11 by attaching the ends 32a and 32b of a winch cable 33 with means not shown, to an eyelet 31 fixed to a nose end of the skid and moving the cable end 32a from the rear to the front of the trailer 11 thereby drawing the loaded skid 25 into the trailer. Reversal of the direction of cable movement pulls the cable end 32b from the trailer 11 front to the rear around pulley 38, thereby pulling the skid 25 from the trailer. Cable 33 movement is accomplished by turning a motorized winch drum 34, FIG. 3, around which the cable is passed to frictionally move the cable in the desired direction. As shown in FIGS. 1 and 4, the winch cable 33, during longitudinal movement of the ends 32a and 32b, travels in a groove track 39 formed in the trailer floor. Alternatively, winch drum 34 could be arranged to reel in cable 33 moving cable end 32a connected to skid 25, drawing the skid 25 into the trailer 11. A second winch, not shown, could then be arranged on the end of the skid bed 15, opposite to the trailer and turned to reel in a cable, not shown, having an end attached to the rear end of the skid 25.

A full load of freight can be loaded or unloaded as a single unit in minutes, whereas manual loading or unloading may require several hours even if fork lifts, conveyor systems, or other such means are used. Once a load of freight is installed in a trailer, should it be desired to off-load portions thereof to facilities which do or do not have freight handling docks, carrier systems like those described as carrier systems 20 or 100, could be used. Such carrier systems are arranged to traverse a van-type trailer interior on rail systems arranged either in the trailer floor, and the rail systems will support the carriers as they move within the trailer, and out from the rear end thereof to deposit pieces of freight directly onto a dock or onto the ground below the trailer, as required.

Both of the carriers described herein are capable of longitudinal lateral, and vertical movement within and without the trailer such that each carrier can position fork tines 60a and 60b, or 112, into the face of a load of freight beneath a defined item or a number of items of freight therein, so as to lift and transport the items of freight thereon. Carrier 20 is operated by an arrangement of hydraulic motors, shown in schematic in FIG. 7a, as the mast rotator motor 77; the cable motor 79a, a fork lift frame motor 79b; and carrier drive wheel motors 80a and 80b.

Carrier 100 is moved through its various attitudes by an arrangement of electric motors 107, 110, 111 and 114. The electric motors, like the hydraulic motors of carrier 20, operate through the cables, drive wheels, and the like move the carrier and the fork platforms 103 in desired planes.

The carriers 20 and 100 each also have the capabilities, through movements of the telescoping frames 48, 52 and 55, of carrier 20 and the top and bottom lifting frames 102a and 102b of carrier 100 of lowering fork platforms 58 and 103, respectively, to points proximate to the ground below the trailer in which they are installed. The carriers 20 or 100 can be moved over the rail systems 18 and 97 respectively, to place freight onto a dock area or to be dismounted from the rail systems for maintenance purposes or to allow a full load of freight to be moved onto or off from the trailer as has been described.

The fork platforms 58 and 103 can be made to tilt, withdraw from a load either by using a two-way hydraulic cylinder 66, as shown in FIG. 7a, or by the operation of an electric motor 114 that turns a wheel 116 against the trailer floor 96c to move the fork tines 112 and fork tine web 112a as described with respect to the operation of carrier 100. The fork tines 60a and 60b and 112 can also be made to tilt, as required, so as to be properly positioned with respect to selected items of freight.

Each of the embodiments of carriers 20 and 100, as well as the freight loading system 14 described, may use a remote console or panel arrangement that is electrically connected to operate the respective hydraulic and electric moving means. Such a console is preferably linked through electrical switches or buttons thereon by an electrical cable to the various hydraulic solenoids or electric motors. This arrangement enables an operator to manipulate the apparatus described to load and unload either a full trailer load of freight or portions thereof, essentially by mechanical means only. The mechanical freight handling, in addition to providing labor savings can also handle loads of freight in far shorter time periods than has been possible using manual or only partially mechanized methods known in the past.

Although preferred forms of my invention have been herein disclosed, it is to be understood that variations to the apparatus and system disclosed herein are possible without departing from the subject matter coming within the scope of the following claims, which subject matter I regard as my invention.

I claim:

1. Mechanized van loading and unloading apparatus comprising a skid;
   means for supporting said skid while a load of freight is arranged thereon, said means for supporting said skid being arranged to position the undersurface of said skid just above the floor of a van-type trailer having a closed roof thereon;
   means for moving said skid into said van-type trailer over the floor thereof;
   means for moving said skid from said trailer back onto said skid supporting means;
   a freight handling carrier means capable of being moved into and out of said van-type trailer for picking up and transporting items of freight thereon;
   rail means arranged in said trailer for supporting and on which said freight handling carrier means moves longitudinally within said trailer, entirely beneath the roof thereof and above the skid when the skid is positioned to overlie the floor, said rail means being extensible outwardly from the rear of said trailer such that said carrier can move thereon outside said trailer;
   means releasably preventing movement of said carrier from the rail means; and
   means for controlling movement of said skid and said freight handling carrier.

2. Mechanized van loading and unloading apparatus as recited in claim 1, wherein the skid includes
   a flat metal plate having a narrow thickness with width and length dimensions which are somewhat less than are the boundary dimensions of the trailer floor; and
   attachment means arranged in at least one end of said skid for connection with the means for moving said skid.

3. Mechanized van loading and unloading apparatus as recited in claim 1, wherein the means for supporting said skid includes
   a frame having upstanding sides and ends spaced such that the distances between the sides and ends conforms to at least the dimensions of the skid and having a plurality of rollers within the sides and ends with roller surfaces projecting upwardly therefrom to receive the skid; and
   a plurality of rollers arranged in the floor for supporting said skid thereon.

4. Mechanized van loading and unloading apparatus as recited in claim 1, wherein the means for moving said skid in said van-type trailer, along the floor thereof includes
   a winch means having a rotatable drum arranged therewith;
   means for rotating said winch drum;
   a cable positioned over said rotatable winch drum and arranged such that an end thereof moves longitudinally within said van-type trailer when said winch drum is rotated; and
   means for attaching said cable end to the end of said skid.

5. Mechanized van loading and unloading apparatus as recited in claim 4, wherein the means for rotating said winch drum includes a hydraulic motor.

6. Mechanized van loading and unloading apparatus as recited in claim 4, wherein
   the cable is arranged over the winch drum such that it has both its ends connected to the end of the skid; and
   said cable is positioned to travel over rollers arranged in the front and rear ends respectively of the trailer, whereby rotation of said winch drum in one direction moves one cable end towards the trailer rear with the other cable end traveling therewith, and whereby reversal of said winch drum reverses the direction of the cable ends.

7. Mechanized van loading and unloading apparatus as recited in claim 4, further including
   roller means spaced in the trailer floor, for supporting the skid as it is moved thereover.

8. Mechanized van loading and unloading apparatus as recited in claim 7, wherein the roller means consists of a plurality of individual rollers each recessed into the trailer floor and arranged to turn axially rotating towards the trailer nose and rear ends respectively.

9. Mechanized van loading and unloading apparatus as recited in claim 1, wherein the freight handling carrier means consists of
   a frame;
   driver wheel means rotatably connected to said frame which driver wheel means are arranged to travel on the rail means;
   means for turning said driver wheel means;
   freight supporting means movably connected to said carrier means frame, to be movable both laterally and vertically within said trailer, for picking up and supporting items of freight thereon;
   means for moving said freight supporting means laterally and vertically;
   means for moving said carrier freight supporting means, vertically to a point below the plane of said trailer floor, when said carrier is moved on said rail means to a point beyond the end of said trailer when said rail means is extended from said trailer rear; and
   means for controlling movement of said carrier means and said freight supporting means arranged therewith.

10. Mechanized van loading and unloading apparatus as recited in claim 9, wherein the freight supporting means consists of
    a fork lifting frame arranged to travel vertically and laterally on said carrier means frame;
    fork tines projecting outwardly from said fork lifting frame; and
    means for moving said fork lifting frame so as to move said fork tines vertically and laterally.

11. Mechanized van loading and unloading apparatus as recited in claim 10, where hydraulic means are arranged within said fork lifting frame for moving said fork lifting frame vertically and laterally.

12. Mechanized van loading and unloading apparatus as recited in claim 9, wherein the means for moving said carrier means freight supporting means vertically to a point below the plane of the trailer floor consists of
- sections of lifting frames, telescoped together, which lifting frames are arranged to be displaced vertically, one within the other, varying the distance between the ends of said telescoped lifting frames, with one end of said telescoped lifting frames attached to the freight handling carrier frame;
- means for telescoping together and moving apart the sections of lifting frames; and
- means for connecting said freight supporting means to said sections of lifting frames, which connection means will allow said freight supporting means to move vertically along said sections of lifting frame.

13. Mechanized van loading and unloading apparatus as recited in claim 1, wherein the means for controlling movement of said skid and said freight handling carrier means consists of
- electrical control means controlling the means for moving said skid, said freight handling carrier means and the freight supporting means of said freight handling carrier means; and
- electrical switches arranged to energize appropriate electrical circuits to initiate and discontinue operations respectively of said means for moving said skid, said freight handling carrier means, and said freight supporting means of said freight handling carrier means.

* * * * *